(12) United States Patent
Lee et al.

(10) Patent No.: US 9,909,305 B2
(45) Date of Patent: Mar. 6, 2018

(54) COMPOSITE WALL ASSEMBLY

(71) Applicant: Ming-Hsun Lee, Tainan (TW)

(72) Inventors: Ming-Hsun Lee, Tainan (TW);
Chia-Ching Lee, Tainan (TW);
Dong-Ying Su, Tainan (TW)

(73) Assignee: Ming-Hsun Lee, Tainan (TW)

( * ) Notice: Subject to any disclaimer, the term of this patent is extended or adjusted under 35 U.S.C. 154(b) by 0 days.

(21) Appl. No.: 15/620,887

(22) Filed: Jun. 13, 2017

(65) Prior Publication Data

US 2017/0362823 A1 Dec. 21, 2017

(30) Foreign Application Priority Data

Jun. 17, 2016 (TW) .............................. 105119054 A

(51) Int. Cl.
*E04B 2/60* (2006.01)
*E04B 2/56* (2006.01)
*E04B 1/94* (2006.01)
*E04C 3/32* (2006.01)

(52) U.S. Cl.
CPC ................ *E04B 2/60* (2013.01); *E04B 1/942* (2013.01); *E04B 2/562* (2013.01); *E04C 3/32* (2013.01); *E04B 2103/06* (2013.01)

(58) Field of Classification Search
CPC ... E04B 2/60; E04B 2/66; E04B 2/562; E04B 1/942; E04B 2103/06; E04C 3/32
See application file for complete search history.

(56) References Cited

U.S. PATENT DOCUMENTS

| 1,798,197 A * | 3/1931 | Eichner | E04B 2/62 |
| | | | 52/243 |
| 4,841,707 A * | 6/1989 | Novoa | E04B 2/66 |
| | | | 52/275 |
| 2004/0128930 A1* | 7/2004 | Ohnishi | E04B 1/78 |
| | | | 52/474 |

\* cited by examiner

*Primary Examiner* — Rodney Mintz
(74) *Attorney, Agent, or Firm* — Alan D. Kamrath; Kamrath IP Lawfirm, P.A.

(57) ABSTRACT

A composite wall assembly has an auxiliary wall and an inner wall. The auxiliary wall has a hollow space and a first supporting pillar having multiple first through holes. The inner wall is attached to the auxiliary wall and forms a depositing space. The inner wall has a first wall member, a second wall member, and a second supporting pillar having multiple second through holes. The depositing space is formed between the first wall member and the second wall member. The auxiliary wall provides a cushion effect and is not damaged easily in the earthquake for protecting the pipelines in the hollow space. The interior ambient temperature of the building is lowered by the hollow space of the auxiliary wall.

7 Claims, 4 Drawing Sheets

COMPOSITE WALL ASSEMBLY

This application claims the benefit of Taiwan patent application No. 105119054, filed on Jun. 17, 2016, the entire contents of which are incorporated herein by reference.

BACKGROUND OF THE INVENTION

1. Field of the Invention

The present invention relates to a composite wall assembly, and more particularly to a composite wall assembly that provides a hollow space for improving effects on environmental protection, energy saving, and heat insulation.

2. Description of Related Art

A wall assembly of a building has an outer wall, an inner wall, and a space. The inner wall is mounted on and is connected to an inner surface of the outer wall. The inner wall has multiple supporting pillars deposited at spaced intervals. Each supporting pillar has multiple through holes deposited at spaced intervals. The inner wall has an inner wall panel. The inner wall panel is mounted on the supporting pillars. The space is formed between the inner wall and the outer wall, and is in communication with the through holes of the supporting pillars for accommodating the water pipelines and the electricity pipelines.

In the construction process, grouting is started after the water pipelines and electricity pipelines are installed, and following grouting, polishing is done to complete the construction process. The construction period is long, during which the polishing work may cause air pollution. In addition, since Taiwan is located on the seismic belt, the building needs to have an anti-seismic capacity for protecting people during the earthquake and further protect the assets and properties of people residing within the building while retaining the function of the building. In the conventional wall assembly, the inner wall is connected to the outer wall, and the structural strength of the inner wall is weaker than the structural strength of the outer wall. Then, the inner wall of the building is damaged in the earthquake, and the pipelines installed in the inner wall are easily broken. Another aspect is the ever-rising environmental awareness to gradually accomplish energy saving and carbon reduction into daily life. Taiwan is located in the subtropical zone with a hot and humid climate. The interior ambient temperature of the building is normally high. People need to frequently turn on cooling appliances for lowering the interior ambient temperature, so energy saving and carbon reduction cannot be effectively achieved.

To overcome the shortcomings, the present invention provides a composite wall assembly to mitigate or obviate the aforementioned problems.

SUMMARY OF THE INVENTION

The objective of the invention is to provide a composite wall assembly that may solve the problems that the pipelines installed in the wall assembly of the building are easily broken in the earthquake and the heat from the outdoors cannot be insulated.

The composite wall assembly has an auxiliary wall and an inner wall. The auxiliary wall has a hollow space and a first supporting pillar. The hollow space is formed in the auxiliary wall. The first supporting pillar has multiple first through holes. The first through holes are connected to the hollow space. An outer surface of the first supporting pillar abuts an inner surface of a wall or a ceiling. The inner wall is attached to the auxiliary wall and forms a depositing space. The inner wall has a first wall member, a second wall member, and a second supporting pillar. The first wall member is connected to the hollow space and has a connecting pillar connected to the first supporting pillar. The depositing space is disposed between the first wall member and the second wall member. The second supporting pillar is mounted between the first wall member and the second wall member, is connected to the connecting pillar, and has multiple second through holes. The second through holes are connected to the depositing space.

Furthermore, the first wall member has a connecting pillar. Two sides of the connecting pillar are respectively connected to the first supporting pillar and the second supporting pillar.

The hollow space exists in the inner space of the auxiliary wall and the depositing space exists in the inner space of the inner wall. For security concerns and construction requirements, the pipelines are installed in the hollow space. The auxiliary wall is located between a wall of the building and the inner wall or is located between a ceiling of the building and the inner wall of the building. The auxiliary wall, providing a cushion effect, is able to maintain the pipelines unharmed during earthquakes so that the earthquake-resistance of the building is increased. Transmittance of thermal energy from an outer wall of the building to the inner wall of the composite wall assembly is decreased due to the hollow space of the auxiliary wall, thereby enhancing heat insulation. In summer, the interior ambient temperature of the building therefore maintains low. It saves energy and reduces carbon emissions. In addition, the hollow space of the auxiliary wall provides a sound-proof effect so an indoor cement finish layer is not necessary. The construction time is saved and air pollution is reduced. The auxiliary wall may be recycled to accord with the standard of healthy buildings.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
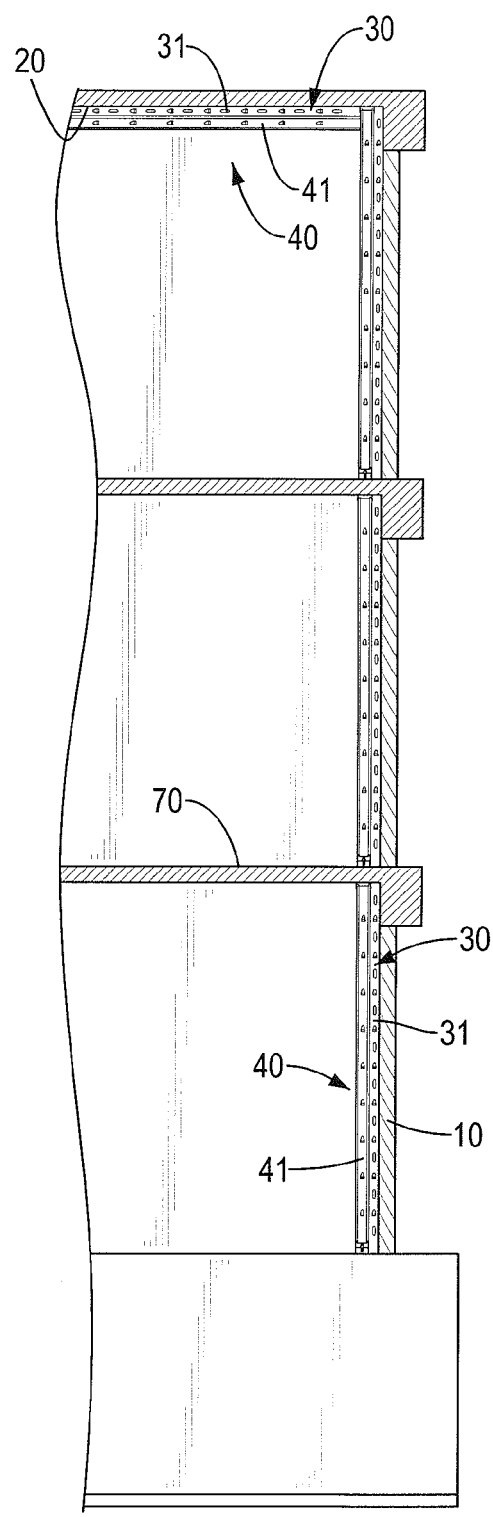
FIG. 1 is a side view in partial section of a first embodiment of a composite wall assembly in accordance with the present invention, showing the composite wall assembly is mounted between a wall and a ceiling of a building.
Figure 2:
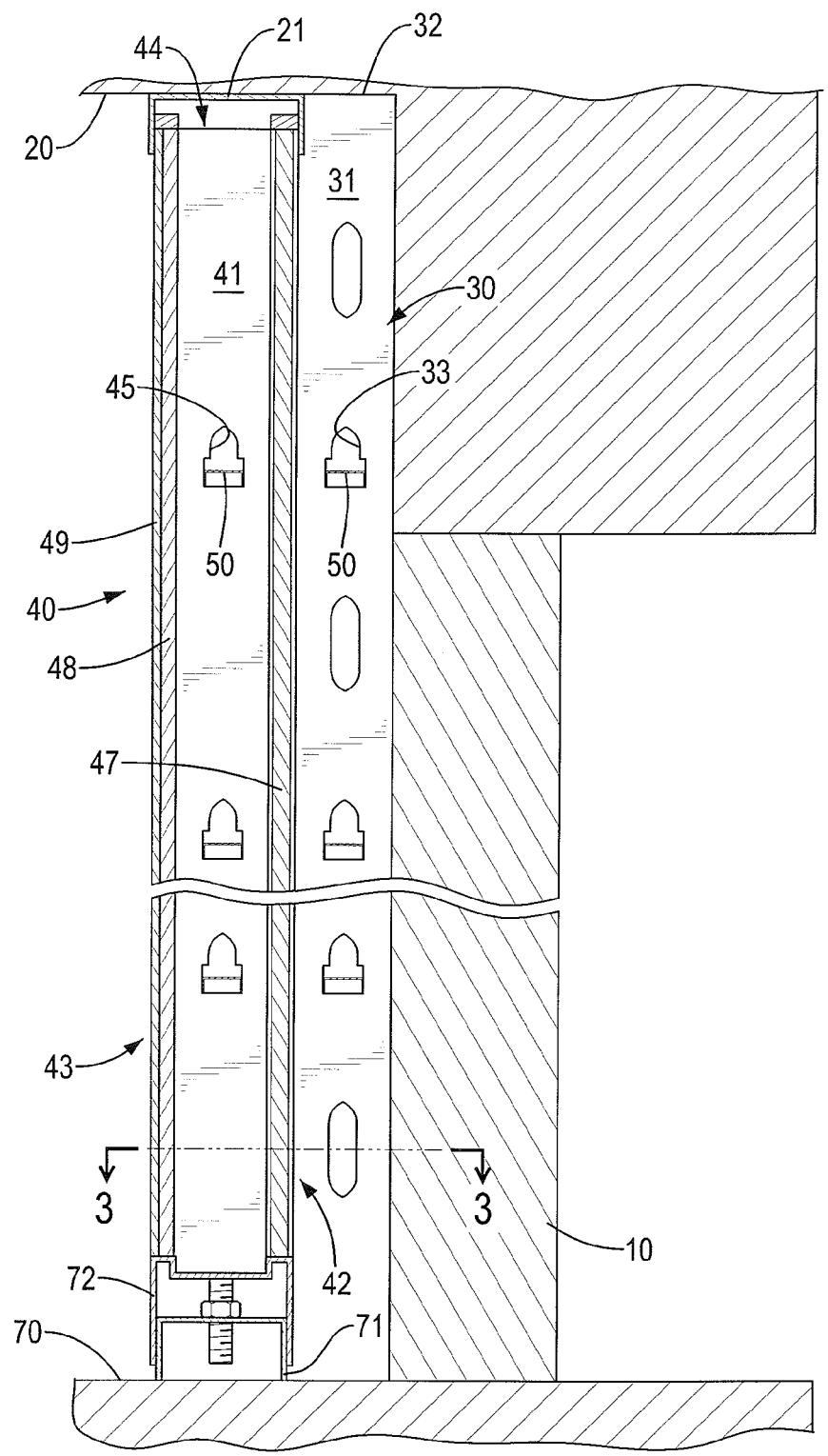
FIG. 2 is a front side view in partial section of the composite wall assembly in FIG. 1.
Figure 3:
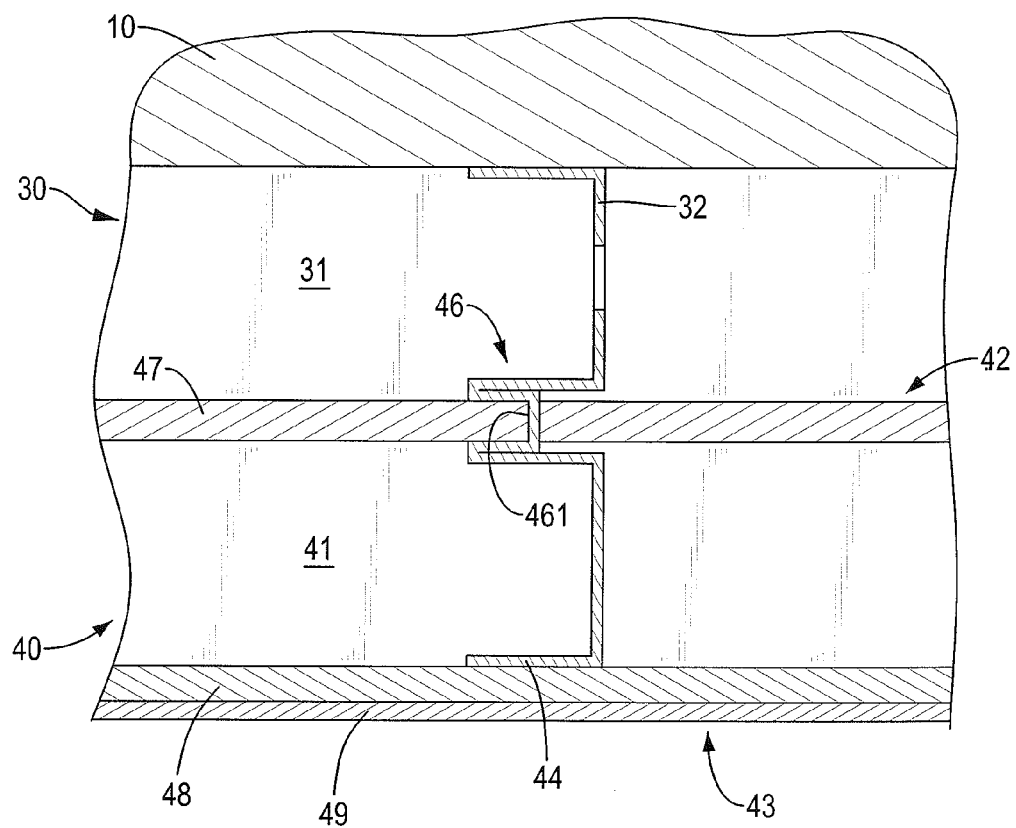
FIG. 3 is a top side view of the composite wall assembly along line 3-3 in FIG. 2.

With reference to FIG. 1, a first embodiment of a composite wall assembly is mounted on a wall 10 or a ceiling 20 inside a building. With reference to FIGS. 2 and 3, the composite wall assembly in accordance with the present invention has an auxiliary wall 30 and an inner wall 40. It is noted that a plurality of the auxiliary walls 30 and an inner walls 40 may be required in a construction for a building.

Each auxiliary wall 30 forms a hollow space 31 for insulating heat and sound and accommodating pipelines. In other words, the hollow space 31 exists in the inner space of the auxiliary wall 30. The inner wall 40 is connected to an inner surface of the auxiliary wall 30. The inner wall 40 forms a depositing space 41. In other words, the depositing space 41 exists in the inner space of the inner wall 40.

The auxiliary wall 30 has at least one first supporting pillar 32. In the first embodiment, a plurality of the first supporting pillars 32 in the auxiliary wall 30 are recommended to enhance the structure. An outer surface of the first supporting pillar 32 abuts an inner surface of the wall 10 or the ceiling 20 of the building. The first supporting pillar 32 has multiple first through holes 33. The first through holes 33 are formed through the first supporting pillar 32 and are in communication with the hollow space 31 of the auxiliary wall 30. The inner wall 40 has a first wall member 42, a second wall member 43, and a second supporting pillar 44. The first wall member 42 is connected to the auxiliary wall 30 and has a connecting pillar 46 connected to the first supporting pillar 32. In the first embodiment, a plurality of the connecting pillar 46 and the second supporting pillars 44 are recommended to enhance the structure.

The depositing space 41 is disposed between the first wall member 42 and the second wall member 43. The second supporting pillar 44 is mounted between the first wall member 42 and the second wall member 43, is connected to the connecting pillar 46 of the first wall member 42, and has multiple second through holes 45. The second through holes 45 are formed through the second supporting pillar 44, and are in communication with the depositing space 41 of the inner wall 40. The hollow space 31 is located at an outer surface of the first wall member 42. The depositing space 41 is formed between an inner surface of the first wall member 42 and an outer surface of the second wall member 43.

The inner surface of the first supporting pillar 32 abuts the first wall member. A distance between the inner and the outer surfaces of the first supporting pillar 32 defines a width of the hollow space 31. The outer surface of the second supporting pillar 44 abuts the first wall member 42, an inner surface of the second supporting pillar 44 abuts the second wall member 43. A distance between the inner and the outer surfaces of the second supporting pillar 44 defines a width of the depositing space 41.

Two sides of the connecting pillar 46 are respectively connected to the first supporting pillars 32 and the second supporting pillar 44.

The connecting pillar 46, the first supporting pillar 32, and the second supporting pillar 44 are integrated in one piece. The connecting pillar 46 has two grooves 461. The grooves 461 are formed on the connecting pillar 46 and are opposite each other. The first wall member 42 has two first wall panels 47. The first wall panels 47 are respectively mounted on the two sides of the connecting pillar 46. Each of the first wall panels 47 is inserted into a respective one of the grooves 461. In addition, the second wall member 43 has a second wall panel 48 and a third wall panel 49. The second wall panel 48 is mounted on and abuts the second supporting pillars 44. The third wall panel 49 is mounted on a side surface of the second wall panel 48 opposite the second supporting pillar 44. The composite wall assembly further has multiple strengthening beams 50. The strengthening beams 50 are respectively inserted through the second through holes 45 of the second supporting pillar 44 and are mounted across on and on the second supporting pillar 44.

With reference to FIG. 2, the composite wall assembly is mounted on the wall 10 of the building. The composite wall assembly has one auxiliary wall 30 and one inner wall 40. In addition, a ceiling track 21 is mounted on the ceiling 20 of the building, and a floor track 71 is mounted on a floor surface 70 of the building and faces the ceiling track 21 mounted on the ceiling 20. A horizontal adjusting member 72 is mounted on the floor track 71. The inner wall 40 is disposed between the ceiling track 21 and the horizontal adjusting member 72.

With reference to FIGS. 2 and 3, the hollow space 31 and the depositing space 41 may accommodate the water pipelines and the electricity pipelines. For security concerns and construction requirements, the pipelines are installed in the hollow space 31 and the depositing space 41. Furthermore, the pipelines may be vertically arranged in the hollow space 31 of the auxiliary wall 30. The pipelines may be horizontal arranged in the depositing space 41 of the inner wall 40.

With reference to FIG. 1, the composite wall assembly is mounted on the ceiling 20 of the building. The composite wall assembly has one auxiliary wall 30 and one inner wall 40. The outer surface of the first supporting pillar 32 abuts an inner surface of the ceiling 20 of the building. The inner wall 40 faces the floor surface 70.

Figure 4:
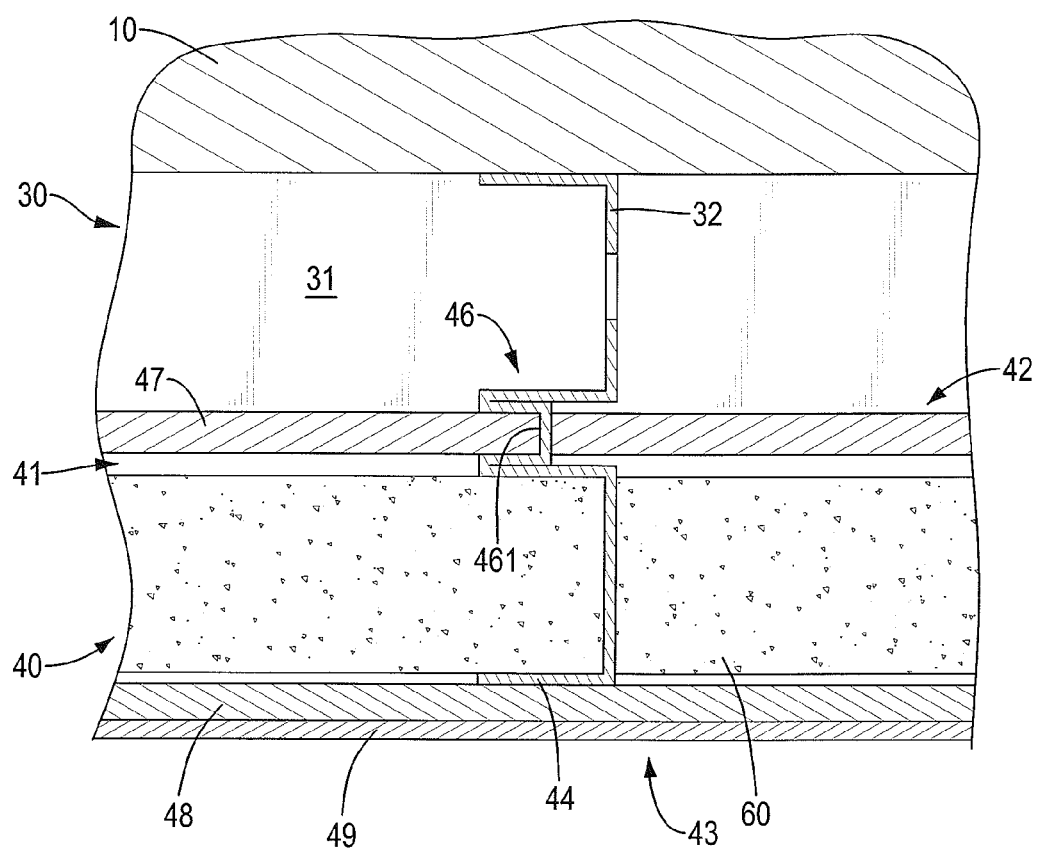
FIG. 4 is a top side view in partial section of a second embodiment of a composite wall assembly in accordance with the present invention, showing the composite wall assembly is mounted on the wall of a building.

With reference to FIG. 4, a second embodiment of a composite wall assembly in accordance with the present invention has a fireproof foam layer 60. The fireproof foam layer 60 is mounted in the deposition space 41 of the inner wall 40.

When the outdoor thermal energy is to be further transmitted to the interior of the building via the auxiliary wall 30 and the inner wall 40, the hollow space 31 effectively reduces the heat transmittance. Moreover, the first wall panel 47 is a fireproof vermiculite plate. The second wall panel 48 is a fireproof gypsum plate or a waterproof plate. The third wall panel 49 is a paint-protected galvanized steel plate.

The composite wall assembly is adopted to the wall construction process to decrease the decoration works such as polishing and painting. The construction time and air pollution are reduced. In addition, if people want to decorate the wall of a building, the composite wall assembly can be adopted without damaging an inner surface and the structure of the wall. The composite wall assembly allows that people re-arrange and re-install pipelines without being limited by the original pipelines installed in the wall 10. The convenience and the applicability of the composite wall assembly are good.

The auxiliary wall 30 of the composite wall assembly is disposed either between the wall 10 of the building and the inner wall 40, or between the ceiling 20 of the building and the inner wall 40. The auxiliary wall 30, providing a cushion effect, is able to maintain the pipelines unharmed during earthquakes so that the earthquake-resistance of the building is increased. The hollow space 31 of the auxiliary wall 30 may enhance heat insulation. In summer, the interior ambient temperature of the building therefore maintains low. It saves energy and reduces carbon emissions.

In addition, the hollow space 31 of the auxiliary wall 30 provides a sound-proof effect. An indoor cement finish layer is not necessary. The construction time is saved and air pollution is reduced. The auxiliary wall 30 may be recycled to accord with the standard of healthy buildings.

What is claimed is:
1. A composite wall assembly, mounted on a wall or a ceiling of a building, comprising:
   an auxiliary wall forming a hollow space, the auxiliary wall having a first supporting pillar having multiple first through holes connecting to the hollow space, wherein an outer surface of the first supporting pillar abuts an inner surface of the wall or the ceiling;

an inner wall attaching to the auxiliary wall and forming a depositing space, the inner wall having a first wall member connecting to the hollow space and having a connecting pillar connecting to the first supporting pillar;

a second wall member, the depositing space being disposed between the first wall member and the second wall member;

a second supporting pillar, mounted between the first wall member and the second wall member, connecting to the connecting pillar, and having multiple second through holes connecting to the depositing space; and multiple strengthening beams, the strengthening beams are respectively inserted only through the second through holes and are mounted across and on the second supporting pillar, wherein two sides of the connecting pillar are respectively connected to the first supporting pillar and the second supporting pillar, and the connecting pillar has two grooves positioned opposite each other.

2. The composite wall assembly as claimed in claim 1, wherein an inner surface of the first supporting pillar abuts the first wall member, and a distance between the inner and the outer surfaces of the first supporting pillar defines a width of the hollow space.

3. The composite wall assembly as claimed in claim 1, wherein an outer surface of the second supporting pillar abuts the first wall member, an inner surface of the second supporting pillar abuts the second wall member, and a distance between the inner and the outer surfaces of the second supporting pillar defines a width of the depositing space.

4. The composite wall assembly as claimed in claim 1, wherein the connecting pillar, the first supporting pillar, and the second supporting pillar is integrated in one piece.

5. The composite wall assembly as claimed in claim 1, wherein the composite wall assembly further comprises a fireproof foam layer mounted in the depositing space.

6. The composite wall assembly as claimed in claim 1, wherein the first wall member has two first wall panels, the two first wall panels are respectively mounted on the two sides of the connecting pillar, and each of the first wall panels is inserted into a respective one of the grooves.

7. The composite wall assembly as claimed in claim 6, wherein the second wall member has a second wall panel and a third wall panel, the second wall panel is mounted on and abuts the second supporting pillar, and the third wall panel is mounted on a side surface of the second wall panel opposite the second supporting pillar.

\* \* \* \* \*